United States Patent [19]
Nercessian

[11] 3,949,271
[45] Apr. 6, 1976

[54] TRANSIENT ABSORBER CIRCUIT FOR REGULATED POWER SUPPLIES

[75] Inventor: Sarkis Nercessian, Long Island, N.Y.

[73] Assignee: Forbro Design Corporation, New York, N.Y.

[22] Filed: Sept. 24, 1974

[21] Appl. No.: 508,920

[52] U.S. Cl.................................. 317/16; 317/50
[51] Int. Cl.² ............................................ H02H 3/20
[58] Field of Search............ 317/9 R, 9 AC, 16, 20, 317/33 RR, 50

[56] References Cited
UNITED STATES PATENTS

| | | |
|---|---|---|
| 3,211,929 | 10/1965 | Prines et al. ...................... 317/50 X |
| 3,571,660 | 3/1971 | Phillips ............................... 317/16 |
| 3,790,809 | 2/1974 | Kuster................................ 317/16 X |

*Primary Examiner*—J D Miller
*Assistant Examiner*—Harry E. Moose, Jr.
*Attorney, Agent, or Firm*—Alfred W. Barber

[57] ABSTRACT

In a high current shunt stabilized regulated power supply transients may occur containing too much energy for the shunt stabilizer to safely absorb. The absorber circuit is designed with capacity to absorb normally encountered transients. If the transient lasts longer than a predetermined interval a crow-bar circuit is activated and the power supply is shut down.

7 Claims, 5 Drawing Figures

TRANSIENT ABSORBER CIRCUIT FOR REGULATED POWER SUPPLIES

BACKGROUND OF THE INVENTION

A power supply is shown and described in U.S. patent application entitled "Regulated Power Supply for Very High Current" was filed on Mar. 22, 1973, Ser. No. 343,792 and continued on Mar. 14, 1974 as Ser. No. 451,302 and is further described in an application filed on July 16, 1973 and bearing Ser. No. 379,418. The present invention is particularly adapted although not limited to use with power supplies as described in the above designated applications.

In the past regulated power supplies have been available for providing regulated output voltage and current. When such power supplies are used to power sensitive equipment which would be damaged by overvoltage, it must be determined whether or not the power supply can completely control its output voltage under all load conditions. Abrupt load changes may cause harmful voltage spikes. One method which has been used to control or eliminate such spikes is the so called "crow-bar" circuit. This circuit employing an SCR, or other device capable of carrying a large current for a short time, is shunted across the output terminals of the power supply. When a spike occurs, the crow-bar shorts the power supply dissipating its stored energy and shutting down the supply. This may save the sensitive equipment from damage but turning off the power supply interrupts operations which should be avoided if possible.

SUMMARY OF THE INVENTION

In accordance with the present invention, overvoltage spikes are absorbed by an absorber circuit without turning off the power supply unless the overvoltage persists too long or occurs too often for the absorber to safely absorb them. Overvoltage conditions exceeding the capacity of the absorber to absorb trip the crow-bar which shorts the output terminals and turns off the power supply. The absorber is turned on and the crow-bar is energized by means of circuits powered from an auxiliary source of voltage which is not turned off by the circuit-breaker associated with the crow-bar. The whole system is implemented by various logic inverters, gates, flip-flops and monostables as well as an operational amplifier and a number of transistors.

Figure 1:
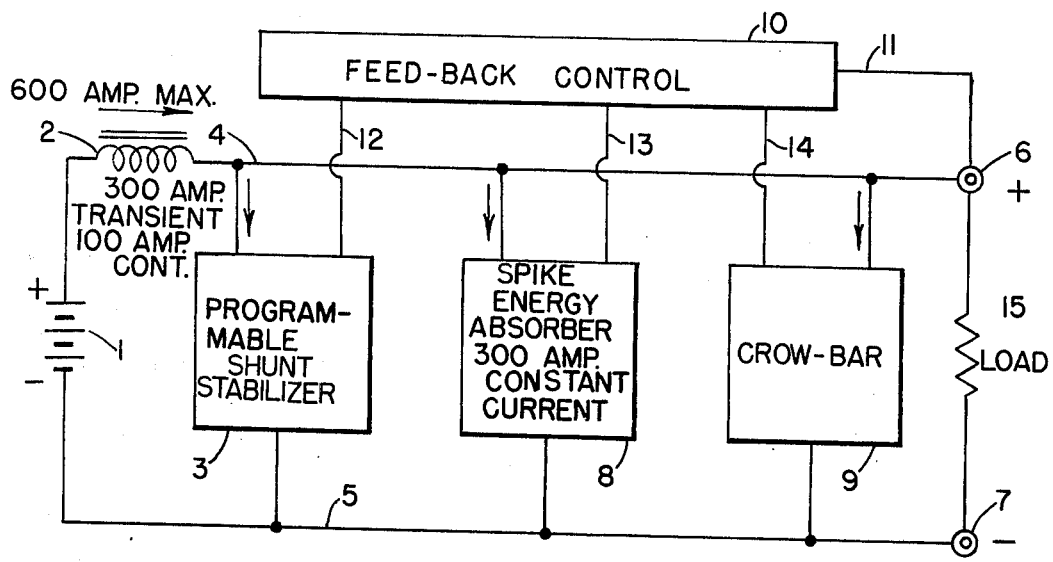
FIG. 1 is a greatly simplified block diagram of a shunt stabilized regulated power supply incorporating the absorber and crow-bar circuits in accordance with the present invention.

FIG. 1 shows in greatly simplified block diagram form a source of voltage to be regulated represented by battery 1, a series impedance in the form of an inductance 2 and a programmable shunt stabilizer 3 connected between the positive output line 4 and the negative output line 5. These output lines are connected to output or load terminals 6 and 7 respectively. Load 15 is connected between output terminals 6 and 7. Spike energy absorber 8 and crow-bar 9 are both shunted across output lines 4 and 5. Shunt stabilizer 3, spike energy absorber 8 and crow-bar 9 are feed-back controlled by means of feed-back control 10 connected to output terminal 6 over lead 11, to shunt stabilizer 3 over lead 12, to energy absorber 8 over lead 13 and to crow-bar 9 over lead 14. Under normal operating conditions the output voltage or current is controlled by means of shunt stabilizer 3 as described in the above referenced patent applications. If, due to sudden changes in the load, the output voltage suddenly rises above a predetermined level, called the absorber level, the feed-back control 10 turns on the spike absorber circuit 8 and the overvoltage spike is absorbed at a rate which keeps the output voltage from rising above the absorber level. However, if the overvoltage spike contains more energy than the absorber can absorb i.e. it lasts longer than a predetermined time interval, the crow-bar is turned on, shorting the output terminals thereby quickly dissipating all the stored energy in the power supply circuits and the power supply is turned off as by opening a circuit-breaker (not shown).

Figure 2:
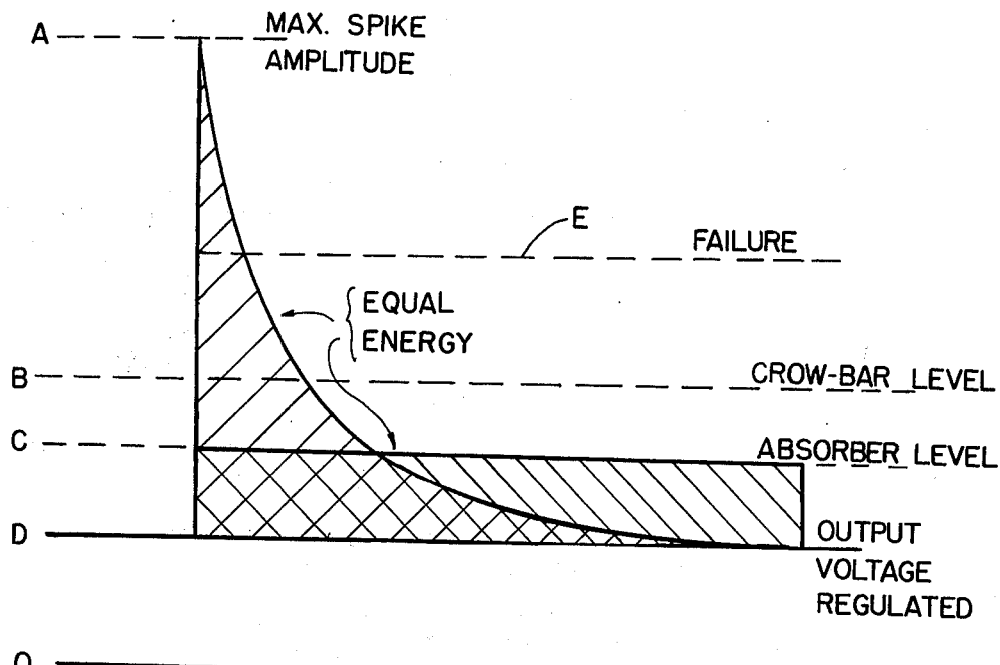
FIG. 2 is a graphic representation of the operation of the invention.

FIG. 2 is a graphical representation of what has been described above. The normal output voltage above 0 is shown as horizontal line D, the absorber level as line C and the crow-bar level as line B. An over voltage spike of maximum amplitude A is shown. The energy in this spike is absorbed by the absorber at a constant voltage equal to the absorber level so that the energy absorbed by the absorber at a constant voltage is equal to the energy in the spike which would have reached an amplitude A were it not prevented by the absorber. Had the spike been of greater energy as represented by line E so that the absorber could not dissipate it in a predetermined time interval the output voltage would rise to the crow-bar level B and turn on the crow-bar. The crow-bar is also turned on if the spike has not been dissipated in a predetermined time as set forth below.

Figure 3:
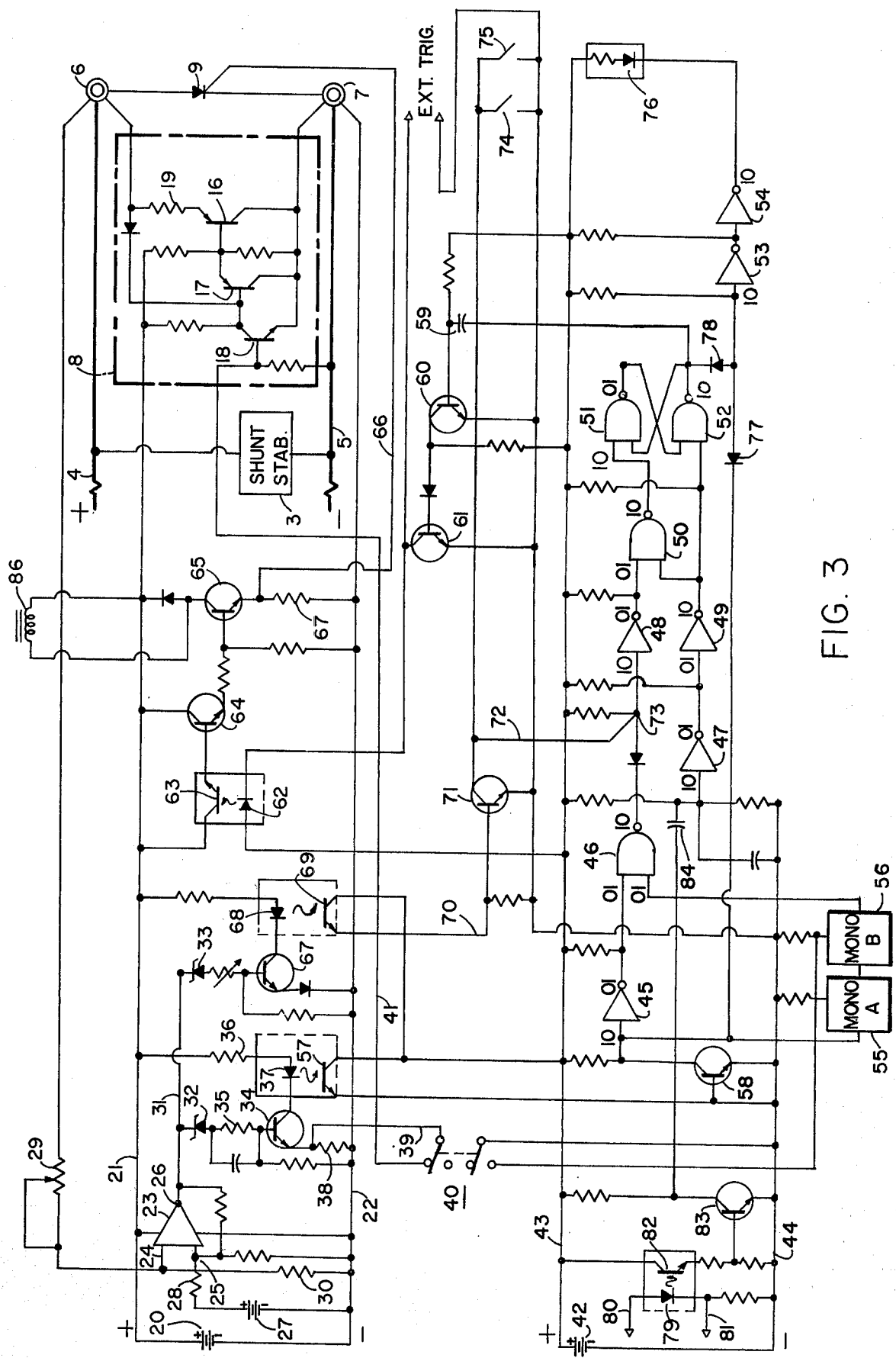
FIG. 3 is a detailed schematic circuit diagram of the present invention as applied to a shunt stabilized power supply.

FIG. 3 shows details of the spike energy absorber circuit while the power supply to which it is connected is represented merely by the positive line 4, positive output terminal 6, negative line 5, negative output terminal 7 and shunt stabilizer 3 connected between the lines 4 and 5 and the crow-bar 9 in the form of an SCR connected between output terminals 6 and 7. One possible form of absorber circuit 8 is shown in the form embodying power transistor 16 driven by cascaded transistors 17 and 18. Power transistor 16 is connected through a current limiting resistor 19 across output terminals 6 and 7 and while shown as a single transistor for simplicity will generally comprise a number of parallel connected transistors and sufficient in number to carry the required absorber current for a predetermined interval of time typically of the order of 40 milliseconds or a little more.

The primary control circuits for turning on the absorber circuit are powered by a small auxiliary power supply represented by battery 20 and supply auxiliary power over positive line 21 and negative line 22. Receiving operating voltage from these lines is a differential amplifier 23 having differential inputs 24 and 25 and output 26. A reference voltage represented by battery 27 is connected through resistor 28 to input 25. The output voltage of the power supply at terminal 6 is divided by resistors 29 and 30 and the portion of the output voltage so chosen is applied to terminal 24. Resistor 29 is adjustable so that the portion of the output voltage can be chosen at will. The portion of the output voltage is chosen so that when the output voltage is normal its comparison with the reference voltage 27 produces little or no positive output voltage on terminal 26 and on line 31 connected thereto. Two zener diodes 32 and 33 are connected to line 31. These two zeners are chosen with different zener voltage and with the zener voltage of zener diode 32 the lower of the two. For purposes of illustration the zener voltages may be 3.3 and 6.5 volts respectively. Now, if the output voltage on output terminal 6 rises sufficiently to cause the output voltage of amplifier 23 to exceed 3.3 volts, zener diodes 32 conducts turning on transistor 34 through base resistor 35. The collector circuit of transistor 34 is energized through resistor 36 and light emitting diode 37 from positive line 21 and the emitter circuit is returned through emitter coupled load resistor 38. The voltage drop produced across resistor 38 when transistor 34 is turned on, is applied over lead 39, through normally closed switch 40 and lead 41 to the base of first driver transistor 18 and thereby turning on the absorber circuit including power transistor 16. This brings into operation the absorber operation holding the output voltage at the absorber level. If the overvoltage is of very short duration, its energy will be absorbed, the output voltage will return to normal and the absorber will be turned off.

While this absorber operation has the substantial advantage that it takes care of most overvoltage spikes thereby preventing destructive overvoltage conditions without crow-barring and thereby turning the power supply off, there are conditions of overvoltage which it cannot handle due to its deliberate design. It is designed to suppress spikes of limited duration and limited duty cycle. Further circuitry is employed which delays further action, while a spike is being absorbed, for a predetermined time and if at the end of that time the spike has not been absorbed, action is initiated to turn on the crow-bar, shorting the supply and opening the power line input circuit.

The time delay action is controlled by logic circuits powered from a second auxiliary power supply represented by battery 42 and providing operating voltages for the logic circuitry between a positive line 43 and a negative line 44. The logic circuits include inverters 45, 47, 48, 49, 53 and 54; NAND gates 46 and 50; monostable multivibrators 55 and 56 and flip-flop 51-52 all powered between lines 43 and 44 over conventional leads, not shown. Two numbers are shown adjacent to the input and ouput terminals of these logic circuits. The first number on the left in each case is the state of the particular input or ouput (0 or 1) in its initial or reset state. The second number shows the second or activated state. This time delay action has no effect as long as the output of gate 46 remains at 1. This condition will pertain as long as at least one of the inputs to gate 46 is at 0.

As has been stated above, when an overvoltage causes the output of amplifier 23 to exceed the zener voltage of zener diode 32, for example 3.3 volts, light emitting diode 37 is energized. This causes phototransistor 57 to conduct and in turn turns transistor 58 on and drops the input to inverter 45 and the input to monostable multivibrator 55 to 0. This places a 1 on the upper input to gate 46 and turns on monostable multivibrator 55. Since the output of monostable multivibrator 56 is 0 at this point, gate 46 still has a 0 on one input and its output remains at 1.

Figure 4:
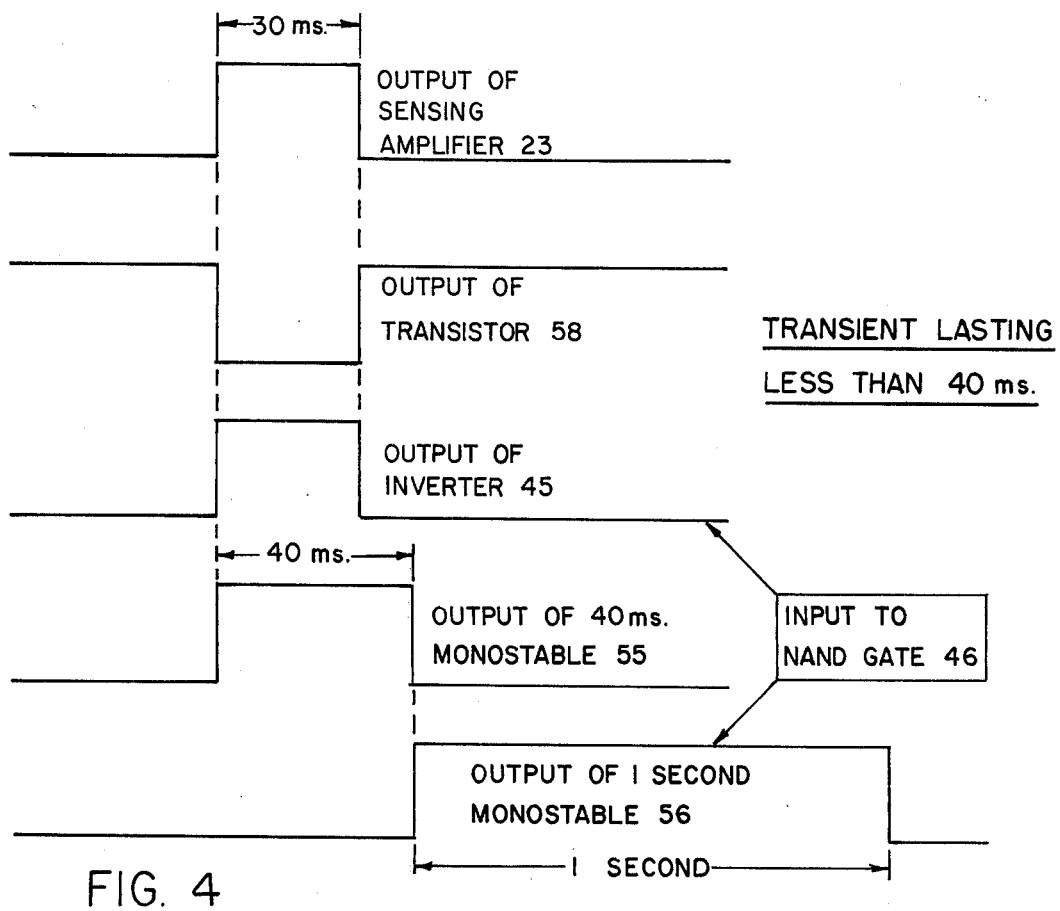
FIG. 4 is a graphical representation of the timing portions of the invention for a transient lasting less than 40 milliseconds.

FIG. 4 will help explain what happens next. This Fig. shows the signal waveforms at various significant points. These are drawn for monostable 55 set to provide a 40 millisecond pulse, monostable 56 to provide a 1 second pulse and for an overvoltage condition which provides a positive output at the output of amplifier 23 for 30 milliseconds i.e. these waveforms are intended to explain what happens when the overvoltage lasts less than a predetermined interval, say 40 milliseconds, the time of the pulse generated by monostable 55. Overvoltage generally lasts about 30 milliseconds so that one lasting more than 40 is abnormal.

The 30 millisecond overload signal from the output of amplifier 23 is inverted by transistor 58 and again by inverter 45 appearing right side up at one input to gate 46. However, the output of monostable 56 is still 0 so there is no change in the output of gate 46. At the end of 30 milliseconds the output of amplifier 23 goes to 0 causing one input to gate 46 to go to 0. At the end of 40 milliseconds monostable 55 goes to 0 causing monostable 56 to put out a 1 pulse to the lower input of gate 46 for an additional period of 1 second. However, by the time the ouput of monostable 56 has gone to 1 the overvoltage has ceased. Thus, at no time are both inputs to gate 46 at 1 and its output remains at 1. However, if a second overvoltage condition appears within the period of 1 second from the first overvoltage spike, both inputs to gate 46 are at 1 and its output goes to 0 creating a condition to trigger the crowbar.

Figure 5:
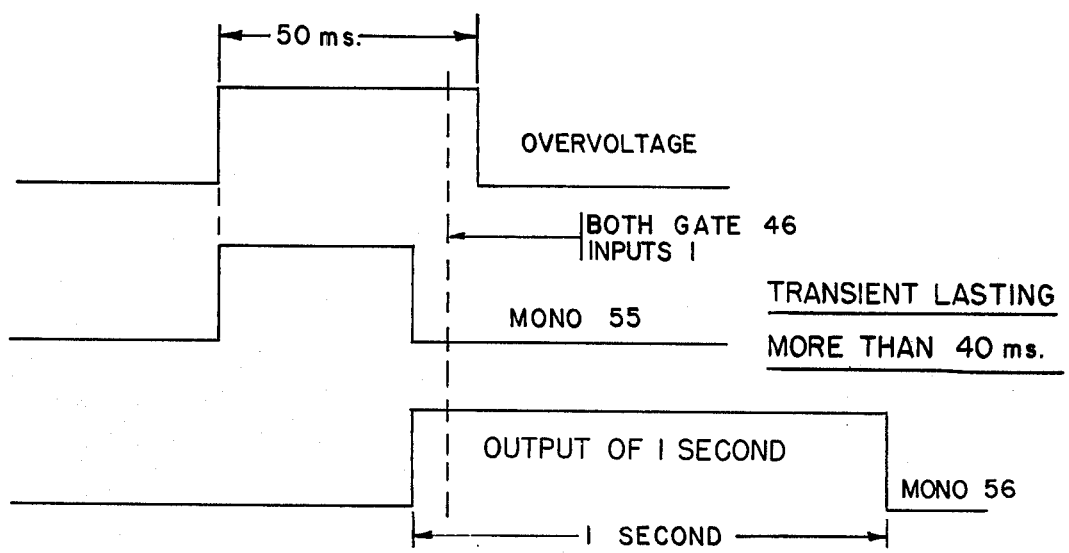
FIG. 5 is the timing for a transient lasting more than 40 milliseconds.

FIG. 5 illustrates what happens when the overvoltage condition lasts longer than the predetermined period of monostable 55, i.e. longer than 40 milliseconds, say for 50 milliseconds. The upper input of gate 46 will be at 1 when the output of monostable 56 goes to 1 making both inputs to gate 46 1 at the same time. When this happens the output of gate 46 goes to 0 and the succession of events are as shown by the second number next to the inputs and outputs of inverter 48, gate 50 and flip-flop 51-52. Repeating, the output of gate 46 goes to 0, the output of inverter 48 goes to 1, the output of gate 50 goes to 0 flipping flip-flop 51-52 to outputs of 1 and 0 respectively. When the output of 52 goes to 0, a pulse coupled through capacitor 59 and amplified by cascaded transistors 60 and 61 turns on light emitting diode 62. This in turn causes light sensitive transistor 63 to conduct turning on cascaded transistors 64 and 65 and the output voltage across emitter resistor 67 turns on crow-bar SCR9 over lead 66. At the same time coil 86 is energized and it being a part of the main circuit breaker of the power supply, turns off the main power to the power supply.

Provision is also made for turning on the crow-bar in another manner. If the absorber circuit is unable to hold the output voltage down to the absorber level for any reason, malfunction or other, the output will rise to the crow-bar level (B in FIG. 2) and the output of amplifier 23 will exceed the zener voltage of zener diode 33 (say 6.3 volts). This will turn on transistor 67 and cause light emitting diode 68 to light up. This in turn causes light sensitive transistor 69 to conduct and over lead 70 to turn on transistor 71. Conduction of transistor 71 places a 0 over lead 72 to junction point 73 and the input to inverter 48. This 0 inverted provides a 1 at the input to gate 50 and the sequence described above continues to the point of turning on crow-bar 9.

The normally open switches 74 and 75 which may, for example, be thermo switches for thermal protection of the power supply, when closed (either or both) place a 0 on the input to inverter 48 resulting in actuating crow-bar 9 as described above.

Various flags and/or indicators may be employed to monitor the operation of the system. One such indicator is light emitting diode 76. When the input to inverter 45 goes to 0, the input to inverter 53 is pulled down to 0 by diode 77 and when inverter twice (by inverters 53 and 54) pulls down the return end of diode 76 causing it to emit light. The output of flip-flop 52, when it goes to 0 (initiating crow-bar operation), also pulls down the input to inverter 53 through diode 78 and lights diode 76 indicator.

After the power supply has been off, whether due to crow-bar operation or manual shut-off, it is necessary to reset flip-flop 51-52 to insure its initial condition. When the power supply is turned on, a voltage is placed across light emitting diode 79 over leads 80 and 81 by suitable circuit means not shown. This causes phototransistor 82 to conduct turning on transistor 83 and causing a negative going pulse to appear at the input to inverter 47 through capacitor 84. This 0 inverted once by inverter 47 and again by inverter 49 places a 0 on the lower input to gate 52 of flip-flop 51-52 causing it to reset to the initial condition with the output of 52 a 1 and of 51 a 0. When the pulse has passed and flip-flop 51-52 has been thus reset, all gates and inverters assume their initial conditions as shown by the numbers on the left of each input and output designation.

Provision is made for setting the absorber and crow-bar operational levels without actually activating these devices. Switch 40 is shown in operating position. However, when switch 40 is depressed so that its contact arms are in a lowered position, the circuit to the absorber over leads 39 and 41 is opened disabling the absorber and monostable flip-flop 56 is grounded disabling the crow-bar. Indicator 76 is still operable indicating set points of absorber and crow-bar although these devices are disabled.

While one particular arrangement of apparatus for carrying out the present invention has been shown and described, other arrangements and combinations are possible within the spirit and scope of the appended claims.

I claim:

1. In a shunt stabilized regulated power supply, the combination of;
  a source of unregulated voltage including series connected inductance;
  a pair of load terminals for connecting a load in shunt with said source;
  programmable shunt stabilizing means connected in shunt with said load terminals for regulating the voltage across said load terminals or the current to said load terminals;
  spike energy absorbing means connected in shunt with said load terminals;
  means responsive to a transient energy spike across the output terminals for activating said absorbing means;
  crow-bar means connected across said load terminals;
  means for sensing unabsorbed spike energy existing after a predetermined period of time;
  and means responsive to sensed unabsorbed spike energy existing after said predetermined period of time for activating said crow-bar means.

2. A shunt stabilized regulated power supply as set forth in claim 1;
  wherein said unabsorbed spike energy is sensed for a predetermined interval of time after the activating of said absorbing means.

3. A shunt stabilized regulated power supply as set forth in claim 2;
  wherein said predetermined period of time is of the order of 40 milliseconds.

4. A shunt stabilized regulated power supply as set forth in claim 3;
  wherein said predetermined period of time is of the order of 40 milliseconds;
  and said predetermined interval of time is of the order of 1 second.

5. A shunt stabilized regulated power supply as set forth in claim 1, and including;
  means for presetting the voltage level at which said absorbing means is activated.

6. A shunt stabilized regulated power supply as set forth in claim 2, and including;
  means for presetting the voltage level at which said crow-bar means is activated.

7. A shunt stabilized regulated power supply as set forth in claim 1, and including;
  means for establishing two independent voltage levels across the load terminals at which said absorbing means and said crow-bar respectively are activated.

* * * * *